(12) United States Patent
Ludewig et al.

(10) Patent No.: US 8,932,722 B2
(45) Date of Patent: Jan. 13, 2015

(54) PROCESS FOR THE PREPARATION OF LOW-VISCOSITY, WATER-DILUTABLE URETHANE (METH)ACRYLATES

(71) Applicant: Allnex IP S.a.r.L., Luxembourg (LU)

(72) Inventors: Michael Ludewig, Odenthal (DE); Stefan Sommer, Leverkusen (DE); Wolfgang Fischer, Meerbusch (DE); Nusret Yuva, Burscheid (DE)

(73) Assignee: ALLNEX IP S.a.r.L. (LU)

( * ) Notice: Subject to any disclaimer, the term of this patent is extended or adjusted under 35 U.S.C. 154(b) by 38 days.

(21) Appl. No.: 13/651,748

(22) Filed: Oct. 15, 2012

(65) Prior Publication Data

US 2013/0095331 A1   Apr. 18, 2013

(30) Foreign Application Priority Data

Oct. 14, 2011   (EP) .................................... 11185176

(51) Int. Cl.
- *B32B 27/40* (2006.01)
- *C09D 175/16* (2006.01)
- *C09J 175/16* (2006.01)
- *C08G 18/40* (2006.01)

(52) U.S. Cl.
USPC ....... 428/423.1; 428/425.1; 528/60; 524/590; 524/591

(58) Field of Classification Search
USPC ........ 428/425.1, 423.1; 528/60; 524/590, 591
See application file for complete search history.

(56) References Cited

U.S. PATENT DOCUMENTS

| | | | |
|---|---|---|---|
| 4,108,814 A | 8/1978 | Reiff et al. | |
| 5,719,316 A | 2/1998 | Ollivier | |
| 6,150,458 A | 11/2000 | Weikard et al. | |
| 6,153,788 A | 11/2000 | Fischer et al. | |
| 2003/0050390 A1 | 3/2003 | Weikard et al. | |
| 2006/0052573 A1* | 3/2006 | Facke et al. | 528/44 |
| 2009/0269589 A1* | 10/2009 | Sommer et al. | 428/425.1 |
| 2013/0095330 A1* | 4/2013 | Sommer et al. | 428/425.1 |

FOREIGN PATENT DOCUMENTS

| | | |
|---|---|---|
| CA | 2253119 A1 | 5/1999 |
| DE | 2446440 C3 | 4/1981 |
| DE | 102010001956 A | 8/2010 |
| EP | 0798290 B1 | 2/2000 |
| EP | 0900778 B1 | 11/2001 |
| EP | 0976716 B1 | 2/2003 |
| EP | 916647 B1 | 1/2005 |
| WO | WO-03/022902 A1 | 3/2003 |
| WO | WO-2009/095432 A1 | 8/2009 |

\* cited by examiner

*Primary Examiner* — Thao T. Tran

(74) *Attorney, Agent, or Firm* — Drinker Biddle & Reath LLP

(57) ABSTRACT

The present invention relates to a process for the preparation of highly reactive, low-viscosity and water-dilutable polyisocyanate reaction products which contain activated groups which react, by polymerization, with ethylenically unsaturated compounds under the action of actinic radiation. The present invention furthermore relates to a process for the preparation of such products and their use.

16 Claims, No Drawings

PROCESS FOR THE PREPARATION OF LOW-VISCOSITY, WATER-DILUTABLE URETHANE (METH)ACRYLATES

CROSS-REFERENCE TO RELATED APPLICATIONS

This application claims benefit under 35 U.S.C. §§119(a)-(d) of European Patent Application No. 11185176.2.0, filed Oct. 14, 2011.

BACKGROUND OF THE INVENTION

The present invention relates to a process for the preparation of highly reactive, low-viscosity and water-dilutable polyisocyanate reaction products which contain activated groups which react, by polymerization, with ethylenically unsaturated compounds under the action of actinic radiation. The present invention furthermore relates to the products prepared by this process and their use.

The curing of coating systems carrying activated double bonds by actinic radiation is known and is established in industry. Actinic radiation is understood as meaning electromagnetic, ionizing radiation, in particular electron beams, UV rays and visible light (Roche Lexikon Medizin, 4th edition; Urban & Fischer Verlag, Munich 1999). It is one of the fastest methods of curing in coating technology. Coating compositions based on this principle are therefore called radiation- or actinic-curing or -curable systems.

Due to the ecological and economic requirements of modern lacquer systems of using as little organic solvent as possible or even no organic solvent to adjust the viscosity, there is the desire on the one hand to use lacquer raw materials which are already low-viscosity and on the other hand moreover to be able to carry out necessary viscosity adjustments with water as the solvent.

Polyurethane dispersions of which the viscosity is adjusted by water are widely used and have also established themselves as radiation-curing raw materials in the lacquer industry. Nevertheless, such dispersions are relatively difficult to prepare due to the necessary dispersing step, and as a rule have only a low solids content of from 30 to 50 wt. %. The high water content of these dispersions must be removed again after application and before curing. On the one hand the possible application thickness of the material is therefore reduced, and on the other hand a longer time for drying in air is required.

Water-dilutable radiation-curing polyurethane systems with which it is possible to achieve very high solids contents of more than 80 wt. % have also been disclosed. These are as a rule polyurethanes which are based on polyethylene oxide polyols and can be diluted with a little water to give a clear solution.

Such a radiation-curable, water-dilutable polyurethane system is described, for example, in WO-A 2009/095432. The binders disclosed can indeed be diluted with water, but after radiation curing they are very soft and not resistant to chemicals. The storage stability of the solution diluted with water is in need of improvement. The UV reactivity of these binders furthermore is also in need of improvement.

Water-compatible, radiation-curable polyurethane systems are also described in DE-A 102010001956. The binders disclosed likewise can be diluted with water, but after radiation curing they are very soft and not resistant to chemicals. The storage stability of the solution diluted with water is likewise in need of improvement. These products also have a UV reactivity worthy of improvement.

It was therefore the object of the present invention to provide a process for the preparation of a radiation-curable polyurethane (meth)acrylate which is of particularly low viscosity as an undiluted system with a solids content of 100 wt. %, i.e. has shear viscosities at 23° C. of ≤100,000 mPas, particularly preferably ≤50,000 and particularly preferably ≤30,000, and can be diluted with water over a wide range. The UV reactivity should furthermore be increased. Furthermore, the water-diluted radiation-curable polyurethane (meth)acrylate should be storage-stable. The radiation-cured films should have an increased pendulum hardness and an adequate resistance to chemicals. The viscosity is determined with a cone-plate rotary viscometer, MCR 51 from Anton Paar, DE, with a shear rate of 50 $s^{-1}$ in accordance with ISO/DIS 3219:1990.

EMBODIMENTS OF THE INVENTION

An embodiment of the present invention is a process for preparing a low-viscosity, water-dilutable polyurethane (meth)acrylate comprising reacting components (a), (c), (d), and (e)
  (a) at least one oligomeric polyisocyanate having an average of at least three isocyanate groups;
  (c) at least one polyoxyalkylene mono-ol;
  (d) at least one hydroxyalkyl (meth)acrylate;
  (e) at least one polyoxyalkylene polyol based on a starter molecule which has at least three hydroxy functions and is partially reacted by esterification with (meth)acrylic acid such that on average 0.2 to 1.5 hydroxy functions still remain;
to form said low-viscosity, water-dilutable polyurethane (meth)acrylate;
wherein said low-viscosity, water-dilutable polyurethane (meth)acrylate has an NCO content of less than 0.5 weight %.

Another embodiment of the present invention is the above process, wherein a further component (b), which is at least one further isocyanate with at least two isocyanate functions, is reacted with components (a), (c), (d), and (e).

Another embodiment of the present invention is the above process, wherein a further component (f), which has at least one compound with at least one group which is reactive towards isocyanate and at least one ionic and/or potentially ionic function, is reacted with components (a), (c), (d), and (e).

Another embodiment of the present invention is the above process, wherein (a) is at least one oligomeric polyisocyanate based on 1,6-hexamethylene-diisocyanate.

Another embodiment of the present invention is the above process, wherein (a) is at least one oligomeric polyisocyanate with isocyanurate groups.

Another embodiment of the present invention is the above process, wherein the polyoxyalkylene mono-ol (c) contains at least 30 mol % of ethylene oxide units.

Another embodiment of the present invention is the above process, wherein component (c) is a polyoxyethylene mono-ol with an OH number of from 18 to 238 mg of KOH/g.

Another embodiment of the present invention is the above process, wherein component (e) contains on average 0.5 to 8.0 ethylene oxide units per OH group of the starter molecule.

Another embodiment of the present invention is the above process, wherein the process is carried out with 20 to 50 weight % of component (a), 0 to 20 weight % of component (b), 10 to 30 weight % of component (c), 4 to 20 weight % of component (d), 25 to 60 weight % of component (e) and 0 to 10 weight % of component (f), wherein the sum of the weight % of components (a) to (f) is 100.

Yet another embodiment of the present invention is a water-dilutable polyurethane (meth)acrylate obtained by the above process.

Yet another embodiment of the present invention is a coating comprising the above water-dilutable polyurethane (meth)acrylate.

Another embodiment of the present invention is the above coating, wherein said coating is a lacquer or adhesive.

Yet another embodiment of the present invention is a coating composition comprising the above water-dilutable polyurethane (meth)acrylate.

Yet another embodiment of the present invention is a coating composition comprising
A) at least one of the above urethane (meth)acrylates;
B) a compound which differs from A) and contains groups which react, by polymerization, with ethylenically unsaturated compounds under the action of actinic radiation;
C) an aqueous binder which is not radiation-curable;
D) an initiators;
E) optionally water and/or a solvent;
F) optionally an auxiliary substance and/or additive.

Yet another embodiment of the present invention is a substrate coated with the coating composition.

Another embodiment of the present invention is the above substrate, wherein said substrate is wood, a ligneous substrate, cork, or a substrate containing cellulose fibres.

DETAILED DESCRIPTION OF THE INVENTION

Surprisingly, a process for the preparation of low-viscosity, water-dilutable polyurethane (meth)acrylates has been found, characterized in that the low-viscosity, water-dilutable polyurethane (meth)acrylates are obtainable by reaction of the components
(a) at least one oligomeric polyisocyanate with on average at least three isocyanate groups,
(b) optionally at least one further isocyanate with at least two isocyanate functions
(c) at least one polyoxyalkylene mono-ol,
(d) at least one hydroxyalkyl (meth)acrylate,
(e) at least one polyoxyalkylene polyol based on a starter molecule which has at least three hydroxy functions and is partially reacted by esterification with (meth)acrylic acid such that on average 0.2 to 1.5, preferably 0.3 to 1.3 and particularly preferably 0.5 to 1.5 hydroxy functions still remain,
(f) optionally at least one compound which has at least one group which is reactive towards isocyanate and at least one ionic and/or potentially ionic function
characterized in that the reaction product has an NCO content of less than 0.5%.

In the context of the invention, the term "water-dilutable" means that the polyurethanes according to the invention are miscible with water. This means that on dilution with water, the viscosity of the polyurethanes according to the invention does not exceed the viscosity of the polyurethane according to the invention with a solids content of 100 wt. %. The solids content of 100 wt. % means that the polyurethane system has not been diluted with water.

The invention also provides water-dilutable urethane (meth)acrylates obtainable by the process according to the invention.

The invention also provides the use of the urethane (meth)acrylates according to the invention obtainable by the process according to the invention for the preparation of coatings and lacquers as well as adhesives, printing inks, casting resins, dental compositions, sizes, photoresists, stereolithography systems, resins for composite materials and sealing compositions.

In the context of this invention, "(meth)acrylate" relates to corresponding acrylate or methacrylate functions or to a mixture of the two.

Oligomeric polyisocyanates with on average at least three NCO groups (a) are polyisocyanates with isocyanurate, biuret, allophanate and/or iminooxadiazinedione groups. Suitable oligomeric polyisocyanates are, for example, those based on 1,3-cyclohexane-diisocyanate, 1-methyl-2,4-diisocyanato-cyclohexane, 1-methyl-2,6-diisocyanato-cyclohexane, tetramethylene-diisocyanate, 4,4'-diisocyanatodiphenylmethane, 2,4'-diisocyanatodiphenylmethane, 2,4-diisocyanatotoluene, 2,6-diisocyanatotoluene, α,α,α',α'-tetramethyl-m- or -p-xylylene-diisocyanate, 1,6-hexamethylene-diisocyanate, 1-isocyanato-3,3,5-trimethyl-5-isocyanatomethylcyclohexane (1-isocyanato-3,3,5-trimethyl-5-isocyanatomethylcyclohexane or IPDI), 4,4'-diisocyanatodicyclohexylmethane, 1,3-bis(isocyanatomethyl)benzene (XDI), 1,3-bis(1-isocyanato-1-methylethyl)benzene (TMXDI) and mixtures thereof. Oligomeric polyisocyanates based on 1,6-hexamethylene-diisocyanate (HDI) are preferred, and oligomeric polyisocyanates with isocyanurate groups based on 1,6-hexamethylene-diisocyanate (HDI) are particularly preferred.

Possible isocyanate-containing compounds (b) are aromatic, aliphatic and cycloaliphatic polyisocyanates. Suitable polyisocyanates are compounds of the formula $Q(NCO)_n$ having an average molecular weight of less than 800, wherein n denotes a number from 2 to 4 and Q denotes an aromatic $C_6$-$C_{15}$-hydrocarbon radical, an aliphatic $C_4$-$C_{12}$-hydrocarbon radical or a cycloaliphatic $C_6$-$C_{15}$-hydrocarbon radical, for example diisocyanates from the series 2,4-/2,6-toluene-diisocyanate (TDI), methylenediphenyl-diisocyanate (MDI), triisocyanatononane (TIN), naphthyl-diisocyanate (NDI), 4,4'-diisocyanatodicyclohexylmethane, 3-isocyanatomethyl-3,3,5-trimethylcyclohexyl-isocyanate (isophorone-diisocyanate=IPDI), tetramethylene-diisocyanate, 1,6-hexamethylene-diisocyanate (HDI), 2-methylpentamethylene-diisocyanate, 2,2,4-trimethylhexamethylene-diisocyanate (THDI), dodecamethylene-diisocyanate, 1,4-diisocyanato-cyclohexane, 4,4'-diisocyanato-3,3'-dimethyldicyclohexylmethane, 4,4'-diisocyanatodicyclohexyl-2,2-propane, 3-isocyanatomethyl-1-methyl-1-isocyanatocyclohexane (MCI), 1,3-diisooctylcyanato-4-methylcyclohexane, 1,3-diisocyanato-2-methylcyclohexane and α,α,α',α'-tetramethyl-m- or -p-xylylene-diisocyanate (TMXDI) and mixtures comprising these compounds.

Reaction products of the abovementioned isocyanates with themselves or with one another to give polyisocyanates with an uretdione, isocyanurate, allophanate, biuret, iminooxadiazinedione and/or oxadiazinetrione structure, such as are described, for example, in J. Prakt. Chem. 336 (1994) 185-200 and EP-A 0 798 290 by way of example are likewise suitable as isocyanate-containing compounds (b).

Polyoxyalkylene mono-ols (c) are employed according to the invention as compounds having a nonionically hydrophilizing action. These polyoxyalkylene mono-ols contain a content of from 30 wt. % to 100 wt. % of units which are derived from ethylene oxide. Preferably, polyoxyalkylene mono-ols containing, as a statistical average, 5 to 70, preferably 7 to 55 ethylene oxide units per molecule, such as are accessible in a manner known per se by alkoxylation of suitable starter molecules (e.g. in Ullmanns Encyclopädie der technischen Chemie, 4th edition, volume 19, Verlag Chemie, Weinheim p. 31-38), are employed.

Such compounds have an OH number of from 18 to 238 mg of KOH/g, preferably of from 56 to 187 mg of KOH/g and very particularly preferably of from 70 to 160 mg of KOH/g.

The OH number is determined titrimetrically in accordance with DIN 53240-2.

Suitable starter molecules for the preparation of these polyoxyalkylene mono-ols are, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane or tetrahydrofurfuryl alcohol, diethylene glycol monoalkyl ethers, such as, for example, diethylene glycol monobutyl ether, unsaturated alcohols, such as allyl alcohol, 1,1-dimethylallyl alcohol or oleyl alcohol, aromatic alcohols, such as phenol, the isomeric cresols or methoxyphenols, araliphatic alcohols, such as benzyl alcohol, anisyl alcohol or cinnamyl alcohol, secondary monoamines, such as dimethylamine, diethylamine, dipropylamine, diisopropylamine, dibutylamine, bis-(2-ethylhexyl)-amine, N-methyl- and N-ethylcyclohexylamine or dicyclohexylamine, and heterocyclic secondary amines, such as morpholine, pyrrolidine, piperidine or 1H-pyrazole. Preferred starter molecules are saturated monoalcohols, and particularly preferred starter molecules are methanol or ethanol.

Alkylene oxides which are suitable for the alkoxylation reaction are, for example, ethylene oxide, 1-butene oxide and propylene oxide, preferably ethylene oxide and propylene oxide, which can be employed in the alkoxylation reaction in any desired sequence or also in a mixture.

The polyoxyalkylene mono-ols are either pure polyethylene oxide polyether mono-ols or mixed polyalkylene oxide polyether mono-ols, the alkylene oxide units of which comprise ethylene oxide units to the extent of at least 30 mol %, preferably to the extent of at least 50 mol %. The use of pure polyethylene oxide mono-ols is particularly preferred.

Hydroxyalkyl (meth)acrylates (d) in the context of the invention are understood as meaning compounds which contain one or more (meth)acrylate groups, in addition to (on average) one hydroxy function. The various functions in this context are bonded by short-chain (C2-C12) linear or branched alkyl chains. Examples of such compounds are hydroxyethyl (meth)acrylate, hydroxypropyl (meth)acrylate, hydroxybutyl (meth)acrylate, 3-hydroxy-2,2-dimethylpropyl (meth)acrylate, glycerol di(meth)acrylate, trimethylolpropane di(meth)acrylate, pentaerythritol tri(meth)acrylate or dipentaerythritol penta(meth)acrylate.

The use of hydroxyethyl (meth)acrylate, hydroxypropyl (meth)acrylate and hydroxybutyl (meth)acrylate is preferred. Hydroxyethyl acrylate and hydroxypropyl acrylate are very particularly preferred.

The use of at least one polyoxyalkylene polyol based on a starter molecule with at least three hydroxy functions (e) is essential to the invention. This component on the one hand leads to a higher water compatibility and on the other hand contributes to the high reactivity of the products according to the invention. Component e) comprises partially esterified short-chain alkoxylated polyols which have been built up by on average 0.5 to 8.0, preferably 3.0 to 6.0 alkylene oxides per hydroxyl group, the alkylene oxide units preferably being ethylene oxide units.

Possible starter molecules are low molecular weight polyols up to a molecular weight of 400 g/mol, such as, for example, trimethylolethane, trimethylolpropane, glycerol, pentaerythritol, di-trimethylolpropane or dipentaerythritol.

The polyoxyalkylene polyols are partially esterified with (meth)acrylic acid, preferably with acrylic acid. In this context, the degree of esterification is chosen such that on average 0.2 to 1.5, preferably 0.3 to 1.3, particularly preferably 0.5 to 1.2 hydroxyl group still remain free and the rest of the hydroxyl groups are esterified with (meth)acrylic acid. The preparation of such partially acrylated alkoxylated, preferably ethoxylated polyols is described e.g. in EP-A 0900778, EP-A 0976716 or WO-A 2003/022902.

Compounds which fall under component (e) preferably have OH numbers of from 20 mg of KOH/g to 200 mg of KOH/g, particularly preferably 40 mg of KOH/g to 150 mg of KOH/g, very particularly preferably 50 to 100 mg of KOH/g of substance.

Component (f) comprises compounds with at least one group which is reactive towards isocyanate and additionally at least one ionic and/or potentially ionic group. It has a hydrophilizing action on the polyurethane (meth)acrylates according to the invention.

The groups having a hydrophilizing action include ionic groups (f1) and/or the ionic groups (f1) which originate from potentially ionic groups (f2) (for example by salt formation) and which can be of anionic nature (f1.1), such as, for example, sulfonium, phosphonium, carboxylate, sulfonate, phosphonate groups, or of cationic nature (f1.2), such as, for example, ammonium groups, and/or potentially ionic groups (f2), i.e. groups which can be converted into ionic groups (f1), for example by salt formation. They are incorporated into the macromolecules by isocyanate-reactive groups. Isocyanate-reactive groups which are preferably suitable are hydroxyl and amino groups.

Compounds containing potentially ionic groups (f2) include compounds with potentially anionic groups (f2.1), such as, for example, mono- and dihydroxycarboxylic acids, mono- and diaminocarboxylic acids, mono- and dihydroxysulfonic acids, mono- and diaminosulfonic acids, mono- and dihydroxyphosphonic acids, mono- and diaminophosphonic acids and/or compounds with potentially cationic groups (f2.2), such as, for example, ethanolamine, diethanolamine, triethanolamine, 2-propanolamine, dipropanolamine, tripropanolamine, N-methylethanolamine, N-methyldiethanolamine and N,N-dimethylethanolamine.

Preferred compounds containing potentially anionic groups (f2.1) are chosen from the group consisting of dimethylolpropionic acid, dimethylolbutyric acid, hydroxypivalic acid, N-(2-aminoethyl)-alanine, 2-(2-aminoethylamino)-ethanesulfonic acid, ethylenediamine-propyl- or -butylsulfonic acid, 1,2- or 1,3-propylenediamine-ethylsulfonic acid, 3-(cyclohexylamino)propane-1-sulfonic acid, malic acid, citric acid, glycollic acid, lactic acid, glycine, alanine, taurine, lysine, 3,5-diaminobenzoic acid, the addition products of acrylic acid on diamines in the ratio of 1:1, such as e.g. on isophoronediamine (EP-A 916 647, Example 1) or on ethylenediamine (PUD salt or N-(2-aminoethyl)-β-alanine), the adduct of sodium bisulfite on but-2-ene-1,4-diol polyether sulfonate and the propoxylated adduct of 2-butene-diol and NaHSO$_3$, as described in DE-A 2 446 440 on page 5-9, formula I-III.

Particularly preferred compounds containing potentially ionic groups (f2) are compounds containing carboxyl, sulfonic acid groups and/or tertiary amino groups, such as, for example, 2-(2-aminoethylamino)-ethanesulfonic acid, 3-(cyclohexylamino)propane-1-sulfonic acid, the addition products of acrylic acid on diamines in the ratio of 1:1, such as e.g. on isophoronediamine (EP-A 916 647, Example 1) or on ethylenediamine (PUD salt or N-(2-aminoethyl)-β-alanine), hydroxypivalic acid, dimethylolpropionic acid, triethanolamine, tripropanolamine, N-methyldiethanolamine and/or N,N-dimethylethanolamine.

Component (f) very particularly preferably contains as compounds with potentially ionic groups the addition products of acrylic acid on diamines in the ratio of 1:1, such as e.g. on isophoronediamine (EP-A 916 647, Example 1) or on ethylenediamine (PUD salt or N-(2-aminoethyl)-β-alanine).

The acids mentioned under component (f) are converted into the corresponding salts by reaction with neutralizing agents, such as e.g. triethylamine, ethyldiisopropylamine, dimethylcyclohexylamine, dimethylethanolamine, ammonia, N-ethylmorpholine, LiOH, NaOH and/or KOH. In this context, the degree of neutralization is preferably between 50 and 125%. The degree of neutralization is defined as follows: In the case of acid-functionalized polymers, as the quotient of base and acid; in the case of base-functionalized polymers, as the quotient of acid and base. If the neutralization is above 100%, in the case of acid-functionalized polymers more base is added than there are acid groups in the polymer; in the case of base-functionalized polymers more acid is added than there are base groups in the polymer.

The bases mentioned under component (f) are converted into the corresponding salts by reaction with neutralizing agents, such as e.g. inorganic acids, such as, for example, hydrochloric acid, phosphoric acid and/or sulfuric acid, and/or organic acids, such as, for example, formic acid, acetic acid, lactic acid, methane-, ethane- and/or p-toluenesulfonic acid. In this context, the degree of neutralization is preferably between 50 and 125%.

The compounds listed under component (f) can also be used in mixtures.

However, the use of component (f) is not preferred.

Component (a) is employed in amounts of from 20 to 50 wt. %, preferably from 25 to 40 wt. %, particularly preferably 26 to 35 wt. %, component (b) in amounts of from 0 to 20 wt. %, preferably from 0 to 10 wt. %, particularly preferably 0 wt. %, component (c) in amounts of from 10 to 30 wt. %, preferably from 12 to 25 wt. %, particularly preferably from 13 to 20 wt. %, component (d) in amounts of from 4 to 20 wt. %, preferably from 5 to 15 wt. %, very particularly preferably from 6 to 12 wt. %, component (e) in amounts of from 25 to 60 wt. %, preferably from 30 to 55 wt. %, particularly preferably from 40 to 52 wt. % and component (f) in amounts of from 0 to 10 wt. %, preferably from 0 to 5 wt. %, very particularly preferably 0 wt. %, with the proviso that the sum of the wt. % of components (a) to (f) is 100.

The reaction of the isocyanate-containing components (a) and optionally (b) with the isocyanate-reactive components (c), (d), (e), optionally (f) is carried out in an urethanation reaction known per se to the person skilled in the art.

In this context, the isocyanate-containing compounds (a) and optionally (b) are reacted with the isocyanate-reactive components (c), (d), (e), optionally (f) in a ratio of equivalents of 1:0.9 to 1:1.5, preferably 1:1 to 1:1.2 and particularly preferably 1:1 to 1:1.05.

The neutralization of the optional component (f) can be carried out before, during or after the reaction with the components (a) and optionally (b).

The reaction is carried out at temperatures of from 25 to 100° C., preferably 40 to 80° C., over a period of time of from 2 to 30 hours, preferably 4 to 15 hours.

In this context, the reaction is carried out until a residual NCO content of less than 0.5%, preferably less than 0.3% is reached.

To accelerate the reaction, it is preferable to employ catalysts. For this, urethanation catalysts known per se to the person skilled in the art, such as e.g. tertiary amines or Lewis acids, are possible. There may be mentioned by way of example organotin compounds, such as e.g. dibutyltin diacetate, dibutyltin dilaurate, dibutyltin bisacetoacetonate or zinc compounds, such as e.g. zinc acetylacetonate or zinc octoate. The use of Lewis acid metal compounds which contain molybdenum, vanadium, zirconium, caesium, bismuth or tungsten is likewise conceivable.

In the process according to the invention, the catalyst component, if co-used, is employed in amounts of 0.001-5.0 wt. %, preferably 0.001-0.1 wt. %, based on the solids content of the process product.

Solvents and/or reactive diluents can optionally be employed at any desired point in the process according to the invention. The use of solvents and/or reactive diluents is not preferred.

Suitable solvents are inert towards the functional groups present in the process product from the point in time of addition to the end of the process. Solvents used in lacquer technology e.g. are suitable, such as hydrocarbons, ketones and esters, e.g. toluene, xylene, isooctane, acetone, butanone, methyl isobutyl ketone, ethyl acetate, butyl acetate, tetrahydrofuran, N-methylpyrrolidone, dimethylacetamide, dimethylformamide, preferably, however, no solvent being added.

Compounds which likewise (co)polymerize during the radiation curing and are thus incorporated into the polymer network and which are inert towards NCO groups can be co-used as reactive diluents. Such reactive diluents are described by way of example in P. K. T. Oldring (ed.), Chemistry & Technology of UV & EB Formulations For Coatings, Inks & Paints, vol. 2, 1991, SITA Technology, London, p. 237-285. These can be esters of acrylic acid or methacrylic acid, preferably of acrylic acid, with mono- or polyfunctional alcohols. Suitable alcohols are, for example, the isomeric butanols, pentanols, hexanols, heptanols, octanols, nonanols and decanols, and furthermore cycloaliphatic alcohols, such as isobornol, cyclohexanol and alkylated cyclohexanols, dicyclopentanol, arylaliphatic alcohols, such as phenoxyethanol and nonylphenylethanol, and tetrahydrofurfuryl alcohols. Alkoxylated derivatives of these alcohols can furthermore be used. Suitable difunctional alcohols are, for example, alcohols such as ethylene glycol, 1,2-propanediol, 1,3-propanediol, diethylene glycol, dipropylene glycol, the isomeric butanediols, neopentyl glycol, 1,6-hexanediol, 2-ethylhexanediol and tripropylene glycol or also alkoxylated derivatives of these alcohols. Preferred difunctional alcohols are 1,6-hexanediol, dipropylene glycol and tripropylene glycol. Suitable trifunctional alcohols are glycerol or trimethylolpropane or alkoxylated derivatives thereof. Tetrafunctional alcohols are pentaerythritol or alkoxylated derivatives thereof. A suitable hexafunctional alcohol is dipentaerythritol or alkoxylated derivatives thereof. The alkoxylated derivatives of the tri- to hexafunctional alcohols mentioned are particularly preferred.

The binders according to the invention are preferably stabilized against premature polymerization. Stabilizers which inhibit the polymerization are therefore added as a constituent of one or more components (a) to (f)) before and/or during the reaction. Examples of suitable stabilizers are e.g. phenothiazine and phenols, such as para-methoxyphenol, 2,5-di-tert-butylhydroquinone or 2,6-di-tert-butyl-4-methylphenol. N-Oxy compounds are also suitable for the stabilization, such as e.g. 2,2,6,6-tetramethylpiperidine N-oxide (TEMPO) or its derivatives. The stabilizers can likewise also be co-incorporated chemically into the binder, and in this context compounds of the abovementioned classes are suitable in particular if they also carry further free aliphatic alcohol groups or primary or secondary amine groups and therefore can be bonded chemically to compounds of component a) via urethane or urea groups. 2,2,6,6-Tetramethyl-4-hydroxypiperidine N-oxide is particularly suitable for this.

Other stabilizers, such as e.g. compounds of the HALS (HALS=hindered amine light stabilizers) class can likewise be used, but are not preferred.

An oxygen-containing gas, preferably air, can be passed into and/or over the reaction mixture to stabilize the reaction mixture, in particular the unsaturated groups against premature polymerization. It is preferable for the gas to have the lowest possible content of moisture, in order to prevent undesirable reaction in the presence of isocyanate.

A stabilizer can be added during the preparation of the binders according to the invention, and in order to achieve a long-term stability after-stabilizing can be finally carried out again with a phenolic stabilizer, and the reaction product can optionally be saturated with air.

In the process according to the invention, it is preferable to employ the stabilizer component in amounts of 0.001-5.0 wt. %, preferably 0.01-2.0 wt. % and particularly preferably 0.05-1.0 wt. %, based on the solids content of the process product.

The process according to the invention is preferably carried out in a stirred reactor.

The course of the reaction can be monitored by suitable measuring equipment installed in the reaction vessel and/or with the aid of analyses on samples taken. Suitable methods are known to the person skilled in the art. They are, for example, viscosity measurements, measurements of the NCO content, measurement of the refractive index, measurement of the OH content, gas chromatography (GC), nuclear magnetic resonance spectroscopy (NMR), infra-red spectroscopy (IR) and near infra-red spectroscopy (NIR). IR spectroscopy for monitoring of the free NCO groups present (for aliphatic NCO groups the band in the IR spectrum is at approx. $\upsilon$=2272 $cm^{-1}$) and GC analyses for unreacted compounds from a) and optionally b) are preferred.

The unsaturated polyurethane (meth)acrylates obtainable by the process according to the invention preferably have shear viscosities at 23° C. of ≤100,000 mPas, particularly preferably ≤50,000 mPas and particularly preferably ≤30,000 mPas at a solids content of 100 wt. %. The viscosity is determined with a cone-plate rotary viscometer, MCR 51 from Anton Paar, DE, with a shear rate of 50 $s^{-1}$ in accordance with ISO/DIS 3219:1990.

The polyurethane (meth)acrylates prepared by the process according to the invention can be diluted with water as desired in order to establish the desired viscosity.

The radiation-curing urethane (meth)acrylates according to the invention can be used for the preparation of coatings and lacquers as well as adhesives, printing inks, casting resins, dental compositions, sizes, photoresists, stereolithography systems, resins for composite materials and sealing compositions. In the case of gluing or sealing, nevertheless, it is a prerequisite that during curing by radiation at least one of the two substrates to be glued or to be sealed with one another must be permeable, i.e. as a rule transparent, to the radiation used for the curing. If an electron beam is used for the curing, an adequate permeability to electrons must be ensured. The use of the urethane (meth)acrylates as binders in lacquers and coatings is preferred.

The invention also provides coating compositions comprising

A) one or more of the urethane (meth)acrylates according to the invention,

B) optionally further compounds which differ from A) and contain groups which react, by polymerization, with ethylenically unsaturated compounds under the action of actinic radiation, C) optionally further aqueous binders which are not radiation-curable, D) initiators, E) optionally solvents and/or water, F) optionally auxiliary substances and additives.

The compounds of component B) include non-aqueous compounds, such as, in particular, urethane (meth)acrylates, preferably based on hexamethylene-diisocyanate, 1-isocyanato-3,3,5-trimethyl-5-isocyanatomethylcyclohexane, 4,4'-diisocyanatodicyclohexylmethane and/or trimethylhexamethylene-diisocyanate, which can optionally be modified with isocyanurate, allophanate, biuret, uretdione and/or iminooxadiazinetrione groups, and which contain no groups which are reactive towards isocyanate groups.

The reactive diluents already described which are known in the art of radiation-curing coatings can furthermore be used as a constituent of B) if they contain no groups which are reactive with NCO groups.

The compounds of component B) also include compounds dissolved or dispersed in water, such as, in particular, dispersions which contain unsaturated, radiation-curable groups, such as e.g. dispersions which contain unsaturated, radiation-curable groups and are based on polyester, polyurethane, polyepoxy(meth)acrylate, polyether, polyamide, polysiloxane, polycarbonate, polyepoxyacrylate, polyester acrylate, polyurethane polyacrylate and/or polyacrylate. In this context, the unsaturated, radiation-curable groups can be present bonded to one of the polymers mentioned and/or present in the form of radiation-curable monomers, so-called reactive diluents, in dispersion alongside the polymers mentioned.

The compounds of component C) include compounds dissolved or dispersed in water, such as, in particular, dispersions which contain no unsaturated, radiation-curable groups, such as e.g. dispersions based on polyester, polyurethane, polyether, polyamide, polysiloxane, polycarbonate, polyurethane polyacrylate and/or polyacrylate.

In particular, if components B) and C) are compounds dissolved or dispersed in water, such as, in particular, dispersions, the addition of the water-dilutable, urethane (meth)acrylates A) according to the invention is advantageous, since the solids content of components B) and C) can be increased in this manner without a substantial increase in the resulting viscosity.

Initiators which can be activated by radiation and/or thermally can be employed as initiators of component D) for a free radical polymerization. Photoinitiators which are activated by UV or visible light are preferred here. A distinction is made in principle between two types of photoinitiators, the unimolecular (type I) and the bimolecular (type II). Suitable (type I) systems are aromatic ketone compounds, such as e.g. benzophenones in combination with tertiary amines, alkylbenzophenones, 4,4'-bis(dimethylamino)benzophenone (Michler's ketone), anthrone and halogenated benzophenones or mixtures of the types mentioned. (Type II) initiators, such as benzoin and its derivatives, benzil ketals, acylphosphine oxides, e.g. 2,4,6-trimethyl-benzoyl-diphenylphosphine oxide, bisacylphosphine oxides, phenylglyoxylic acid esters, camphorquinone, α-aminoalkylphenones, α,α-dialkoxyacetophenones and α-hydroxyalkylphenones, are furthermore suitable.

The initiators, which are employed in amounts of between 0.1 and 10 wt. %, preferably 0.1 to 5 wt. %, based on the weight of the lacquer binder, can be used as the individual substance or, because of frequent advantageous synergistic effects, also in combination with one another.

If electron beams are used instead of UV radiation, no photoinitiator is required. Electron radiation, as is known to the person skilled in the art, is generated by means of thermal emission and accelerated via a potential difference. The high-energy electrons then break through a titanium film and are deflected to the coating composition to be cured. The general principles of electron beam curing are described in detail in "Chemistry & Technology of UV & EB Formulations for Coatings, Inks & Paints", vol. 1, P. K. T. Oldring (ed.), SITA Technology, London, England, p. 101-157, 1991.

In the case of thermal curing of the activated double bonds, this can also be carried out with addition of thermally dissociating agents which form free radicals. As is known to the person skilled in the art, suitable agents are e.g. peroxy compounds, such as dialkoxy dicarbonates, such as e.g. bis(4-tert-butylcyclohexyl) peroxydicarbonate, dialkyl peroxides, such as e.g. dilauryl peroxide, peresters of aromatic or aliphatic acids, such as e.g. tert-butyl perbenzoate or tert-amyl peroxy-2-ethylhexanoate, inorganic peroxides, such as e.g. ammonium peroxodisulfate, potassium peroxodisulfate, organic peroxides, such as e.g. 2,2-bis(tert-butylperoxy)butane, dicumyl peroxide, tert-butyl hydroperoxide, or also azo compounds, such as 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methylpropionamide), 2,2'-azobis{2-methyl-N-[2-(1-hydroxybutyl)]-propionamide}, 2,2'-azobis{2-methyl-N-[2-(1-hydroxybutyl)]propionamide, 2,2'-azobis{2-methyl-N-[1,1-bis(hydroxymethyl)-2-hydroxyethyl]propionamide. Highly substituted 1,2-diphenylethanes (benzopinacols), such as e.g. 3,4-dimethyl-3,4-diphenylhexane, 1,1,2,2-tetraphenylethane-1.2-diol or also silylated derivatives thereof, are also possible.

It is also possible to use a combination of photoinitiators and initiators which can be activated thermally.

Organic solvents which are known per se to the person skilled in the art can also optionally be co-used as component E). However, it is preferable to employ water as the sole diluent.

The composition can also contain UV absorbers and/or HALS stabilizers as auxiliary substances and additives (component F)) to increase the stability of the cured lacquer layer to weathering. A combination of UV absorbers and HALS stabilizers is preferred. The former advantageously have an absorption range of not more than 390 nm, for example UV absorbers such as triphenyltriazine types (e.g. Tinuvin® 400 (Ciba Spezialitätenchemie GmbH, Lampertheim, DE)), benzotriazoles (e.g. Tinuvin® 622 (Ciba Spezialitätenchemie GmbH, Lampertheim, DE)) or oxalic acid dianilides (e.g. Sanduvor® 3206 (Clariant, Muttenz, CH)), and are added in amounts of 0.5-3.5 wt. %, based on the solid resin. Suitable HALS stabilizers are obtainable commercially (Tinuvin® 292 or Tinuvin® 123 (Ciba Spezialitätenchemie GmbH, Lampertheim, DE) or Sanduvor® 3258 (Clariant, Muttenz, CH)). Preferred amounts are 0.5-2.5 wt. %, based on the solid resin.

Likewise, F) can contain further auxiliary substances and additives known in lacquer technology, such as e.g. pigments, including metallic effect pigments, dyestuffs, matting agents, fillers, flow, wetting and deaeration additives, slip additives, nanoparticles, anti-yellowing additives, thickeners and additives for reduction of the surface tension.

The application of the coating compositions according to the invention to the material to be coated is carried out using the conventional and known methods in coating technology, such as spraying, knife-coating, rolling, pouring, dipping, whirler-coating, brushing or misting or by printing techniques, such as screen, gravure, flexographic or offset printing, and by transfer methods.

Suitable substrates are, for example, wood, metal, in particular also metal such as is used in the uses of so-called wire, coil, can or container lacquering, and furthermore plastic, also in the form of films, in particular ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PU, PVC, RF, SAN, PBT, PPE, POM, PU-RIM, SMC, BMC, PP-EPDM and UP (abbreviations according to DIN 7728 Part 1), paper, leather, textiles, felt, glass, wood, wood materials, cork, inorganically bonded substrates, such as wood and fibre cement boards, electronic assemblies or mineral substrates. Substrates which comprise various of the abovementioned materials, or already coated substrates, such as vehicles, aircraft or ships and parts thereof, in particular vehicle bodies or attachments, can also be lacquered. It is also possible to apply the coating compositions only temporarily to a substrate and then to cure them partly or completely and optionally detach them again in order e.g. to produce films.

In particular, the coating compositions according to the invention are suitable for coating wood, wood-containing substrates, cork and substrates containing cellulose fibres, such as paper or cardboard.

For curing, e.g. water or, where appropriate, solvents present can be completely or partly removed by allowing to evaporate in air.

During the evaporation in air or thereafter, thermal and/or photochemical curing can be carried out.

If necessary, the thermal curing can be carried out at room temperature, but also at elevated temperature, preferably at 40-160° C., preferably at 60-130° C., particularly preferably at 80-110° C.

If photoinitiators are used in D), the radiation curing is preferably carried out by the action of actinic radiation, for example by irradiation with UV radiation or daylight, e.g. light of wavelength 200 to 700 nm, or by irradiation with high-energy electrons (electron radiation, 150 to 300 keV). High or medium pressure mercury vapour lamps, for example, serve as radiation sources for light or UV radiation, it being possible for the mercury vapour to be modified by doping with other elements, such as gallium or iron. Lasers, pulsed lamps (known by the name UV flash lamps), halogen lamps or excimer lamps are likewise possible. The lamps can be equipped, as a result of their design or by the use of special filters and/or reflectors, such that emission of a part of the UV spectrum is prevented. For example, for industrial hygiene reasons e.g. the radiation assigned to UV-C or UV-C and UV-B can be filtered out. The lamps can be installed in a fixed position, so that the goods to be irradiated are passed by the radiation source by means of a mechanical device, or the lamps can be movable and the goods to be irradiated do not change their position during curing. The radiation dose conventionally sufficient for crosslinking in UV curing is in the range of from 80 to 5,000 $mJ/cm^2$.

The irradiation can optionally also be carried out with exclusion of oxygen, e.g. under an inert gas atmosphere or oxygen-reduced atmosphere. Suitable inert gases are, preferably, nitrogen, carbon dioxide, noble gases or combustion gases. The irradiation can furthermore be carried out by covering the coating with media which are transparent for the radiation. Examples of these are e.g. films of plastic, glass, or liquids, such as water.

The type and concentration of the initiator optionally used are to be varied in a manner known to the person skilled in the art, depending on the radiation dose and curing conditions.

High pressure mercury lamps in installations of fixed position are particularly preferably employed for the curing. Photoinitiators are then employed in concentrations of from 0.1 to 10 wt. %, particularly preferably 0.2 to 3.0 wt. %, based on the solids of the coating. For curing these coatings, a dose of from 200 to 3,000 mJ/cm$^2$, measured in the wavelength range of from 200 to 600 nm, is preferably used.

If thermally activatable initiators are used in D), curing is carried out by increasing the temperature. In this context, the thermal energy can be introduced into the coating by radiation, thermal conduction and/or convection, the infra-red lamps, near infra-red lamps and/or ovens customary in coating technology conventionally being employed.

It is preferable to carry out the curing by actinic radiation.

The layer thicknesses applied (before curing) are typically between 0.5 and 5,000 µm, preferably between 5 and 1,000 µm, particularly preferably between 15 and 200 µm. If solvents are used, this is removed by the usual methods after the application and before the curing.

The invention also provides a process for the production of coatings on wood, ligneous substrates, cork and substrates containing cellulose fibres, characterized in that the coating composition according to the invention is applied to the wood, ligneous substrates, cork and substrates containing cellulose fibres as described above and is then cured as described above.

The invention also provides substrates coated with the coating compositions according to the invention which contain the urethane (meth)acrylates prepared by the process according to the invention.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

Unless stated otherwise, all the percentage data relate to percent by weight.

The solids content of the polyurethane dispersion was determined gravimetrically after all the non-volatile constituents had been evaporated off, in accordance with DIN EN ISO 3251.

The determination of the NCO contents in % was carried out via back-titration with 0.1 mol/l of hydrochloric acid after reaction with butylamine, on the basis of DIN EN ISO 11909.

The viscosity measurements on the polyurethane (meth) acrylates were carried out at 23° C. with a plate-plate rotary viscometer, RotoVisko 1 from Haake, DE, with a shear rate of 47.94/s in accordance with ISO/DIS 3219:1990.

The ambient temperature of 23° C. prevailing at the time the experiments were carried out is called RT.

The OH number was determined in accordance with DIN 53240-2.

The acid number was determined in accordance with DIN EN ISO 2114.

Desmodur® N 3600: aliphatic polyisocyanate (low-viscosity HDI trimer), solvent-free, NCO content 23.0%, viscosity: 1,200 mPa·s/23° C. (Bayer MaterialScience AG, Leverkusen, DE)

MPEG 500: methanol-started polyethylene oxide mono-ol with a number-average molecular weight (Mn) of 500 g/mol Desmodur® T80: 2,4- and 2,6-toluene-diisocyanate (TDI) in the ratio of 80:20, Bayer MaterialScience AG, Leverkusen, DE Carbowax® PEG 3000: polyethylene oxide diol with a number-average molecular weight (Mn) of 3,000 g/mol, Dow, Midland, Mich., US Carbowax® PEG 4000: polyethylene oxide diol with a number-average molecular weight (Mn) of 4,000 g/mol, Dow, Midland, Mich., US Polyol R 4290: alkoxylated polyol (15-fold ethoxylated pentaerythritol), Perstorp Holding AB, Perstorp, SE Polyol R 4630: 5-fold ethoxylated pentaerythritol, Perstorp Holding AB, Perstorp, SE Epilox® A-1900: bisphenol A diglycidyl ether, Leuna-Harze GmbH, Leuna, DE Partially acrylated alkoxylated polyol 1

910.5 g of a trimethylolpropane-started ethylene oxide polyether with an OH number of 255 mg of KOH/g of substance (4 ethylene oxide units per OH group of the trimethylolpropane), 198.2 g of acrylic acid, 11.5 g of p-toluenesulfonic acid, 9.2 g of p-methoxyphenol and 0.6 g of 2,5-di-tert-butylhydroquinone in 455.2 g of isooctane were initially introduced into a 4,000 ml four-necked glass flask with a reflux condenser, heatable oil bath, mechanical stirrer, line for passing air through (4 l/h), internal thermometer, dropping funnel and water separator and were heated to 95° C. After approx. 36 hours under reflux, 50.5 g of water were separated off, and at this point in time the acid number was 3.4 mg of KOH/g of substance. The isooctane was distilled off at 50° C. under reduced pressure. 19.6 g of glycidyl methacrylate were then added at 90° C. and the mixture was stirred at 100° C. for a further hour. A colourless resin with an acid number of 0.4 mg of KOH/g, an OH functionality (per molecule) of 1.11, an alkylene oxide content of 66 wt. % and a viscosity of 189 mPas (23° C.) was obtained.

Example 1

Water-Dilutable Binder According to the Invention 350.12 g of Desmodur® N3600, 1.20 g of 2,6-di-tert-butyl-4-methylphenol and 0.72 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 60° C. 88.66 g of hydroxyethyl acrylate, then 570.47 g of partially acrylated alkoxylated polyol 1 and finally 188.74 g of MPEG 500 were then successively added dropwise such that a temperature of 65° C. was not exceeded. The mixture was subsequently stirred until the theoretical NCO value had fallen to less than 0.2%. A clear, slightly yellowish resin with a residual NCO content of 0.0% and a viscosity of 19,040 mPas (23° C.) was obtained.

Example 2 (Comparison)

Analogous to Example 3 from DE-A 102010001956

363.03 g of polyethylene glycol 1000, 0.56 g of dimethylolpropionic acid, 3.79 g of neopentyl glycol, 67.36 g of hydroxyethyl acrylate, 191.68 g of dipropylene glycol diacrylate, 0.56 g of 2,6-di-tert-butyl-4-methylphenol, 0.06 g of phenothiazine, 0.56 g of tempol, 0.03 g of 2,5-di-tert-butylhydroquinone and 0.40 g of dibutyltin dilaurate were initially introduced into a 2,000 ml four-necked glass flask with a reflux condenser, heatable oil bath, mechanical stirrer, line for passing air through (2 l/h), internal thermometer and dropping funnel and were heated to 60° C. 139.00 g of Desmodur® T80 were then added dropwise such that the temperature of 70° C. was not exceeded. The mixture was subsequently stirred until an NCO value of 0.26% was reached. 21.46 g of dibutylamine were then added and the mixture was stirred at 65° C. for a further two hours. Finally, a further 117.46 g of dipropylene glycol diacrylate were admixed. A colourless resin with a viscosity of 8,000 mPas (23° C.) was obtained.

Example 3 (Comparison)

Analogous to Example 1 from WO-A 2009/095432

210.6 g of Carbowax® PEG 3000, 187.2 g of Carbowax® PEG 4000 together with 58.50 g of isophorone-diisocyanate (see above) and 316 g of acetone were initially introduced into a 2,000 ml four-necked glass flask with a reflux condenser, heatable oil bath, mechanical stirrer, line for passing air through (2 l/h), internal thermometer and dropping funnel and were heated to 50° C. 0.8 g of dibutyltin dilaurate was then added and the mixture was stirred at 60° C. for about two hours. First 0.8 g of 2,6-di-tert-butyl-4-methylphenol and then 336 g of pentaerythritol triacrylate were subsequently added and the mixture was stirred at 70° C. until an NCO value of less than 0.2% had been reached. After distilling off the acetone under reduced pressure, a resin which is solid at 23° C. was obtained.

Example 4 (Comparison)

Analogous to Example 2 from WO-A 2009/095432

674 g of Polyol R 4290, 935 g of Polyol R 4630, 653 g of isooctane, 16.8 g of p-toluenesulfonic acid, 6.7 g of 4-methoxyphenol, 0.45 g of 2,5-di-tert-butylhydroquinone and 751 g of acrylic acid were initially introduced into a 2,000 ml four-necked glass flask with a reflux condenser, heatable oil bath, mechanical stirrer, line for passing air through (2 l/h), internal thermometer and water separator and the temperature was increased slowly to the boiling point of the isooctane (95-105° C.), until a vigorous reflux had become established. Approx. 125 g of water were then separated off and the reaction was interrupted when an acid number of 4 mg of KOH/g was reached. The water separator was replaced by a distillation bridge and the isooctane was distilled off first under normal pressure and later under a reduced pressure of 50 mbar. 76 g of Epilox® A-1900 were then admixed and the mixture was stirred at 100° C. for approx. one hour.

808 g of the product obtained in this way were initially introduced into a 1,000 ml four-necked glass flask with a reflux condenser, heatable oil bath, mechanical stirrer, line for passing air through (1 l/h), internal thermometer and dropping funnel together with 0.44 g of 2,6-di-tert-butyl-4-methylphenol and 0.74 g of dibutyltin dilaurate and were heated to 60° C. 40.8 g of Desmodur® I were then slowly added dropwise and the mixture was subsequently stirred at 60° C. until the NCO content had fallen below 0.2%. A colourless resin with a viscosity of 830 mPas was obtained.

Lacquer Formulation and Use Testing

The water-dilutable polyurethane (meth)acrylates prepared were mixed with 3 wt. % of Irgacure® 500 (mixture of benzophenone and 1-hydroxycyclohexyl phenyl ketone from BASF SE, Ludwigshafen, DE) and the corresponding amount of water (see Table 1) under shearing forces in a dispersing apparatus at 2,000 revolutions for 10 minutes. The mixture was drawn as a thin film on to a glass plate or oak wood sheet by means of a box doctor blade with a gap of 90 μm. After UV irradiation (medium pressure mercury lamp, IST Metz GmbH, Nürtingen, DE, 411 mJ/cm$^2$), transparent, solid coatings were obtained.

The reactivity was measured by setting various belt running speeds during the UV irradiation (medium pressure mercury lamp, IST Metz GmbH, Nürtingen, DE) of the products drawn on to glass (90 μm) (see above). The highest belt running speed at which a tack-free film was still obtained is stated. A higher value accordingly also means a higher reactivity.

The storage stability of the lacquer was tested at 23° C. (RT) with respect to after how many days a phase separation or a sedimentation takes place.

The adhesion to oak was tested by means of a cross-hatch test in accordance with DIN EN ISO 2409. (Rating 0: the cut edges are completely smooth; none of the squares of the grid has split off).

The König pendulum hardness was tested on glass in accordance with DIN EN ISO 1522.

Testing against chemicals, such as 10% strength sodium hydroxide solution or 48% strength ethanol, was carried out in accordance with DIN 68861-1 and DIN EN 12720 on an oak wood sheet. (Rating 5: lacquer remains unchanged, rating 1: marked change in the surface, e.g. detachment of the lacquer)

TABLE 1

Test results on wood and glass

| Examples | 1 | 2 (comparison) | 3 (comparison) | 4 (comparison) |
|---|---|---|---|---|
| Viscosity 100 % [mPas] | 19,040 | 8,000 | solid | 830 |
| Reactivity | 40 m/min | 25 m/min | 10 m/min | 15 m/min |
| König pendulum hardness | 80 s | 26 s | 70 s | 40 s |
| Resistance to ethanol/water (48 %) | 4 | 1 | 1 | 3 |
| Adhesion (oak) | 5 | 5 | 5 | 5 |
| Viscosity 90 % [mPas] | 4,400 | 2,000 | 11,000 | 370 |
| Stability in days | >40 | >40 | >40 d | 10 |
| Adhesion (oak) | 5 | 5 | 5 | 5 |
| Viscosity 80 % [mPas] | 2,660 | 1,800 | 5,000 | 330 |
| Storage stability in days | >40 | 2 | >40 | 1 |
| Adhesion (oak) | 0 | 0 | 0 | 0 |

TABLE 1-continued

Test results on wood and glass

| Examples | 1 | 2 (comparison) | 3 (comparison) | 4 (comparison) |
|---|---|---|---|---|
| Viscosity 50 % [mPas] | 1,900 | 180 | 7,000 | — |
| Stability in days | >40 | 1 | >40 | —[1] |
| Adhesion (oak) | 0 | 0 | 0 | — |

[1]Phase separation immediately or a few minutes after mixing of the lacquer

All the products show a very good adhesion to wood as soon as they were diluted with at least 20 wt. % of water.

Example 1 according to the invention has an acceptable hardness of more than 50 pendulum seconds and is stable in relatively high dilutions in water. In contrast to Example 3 (comparison), however, Example 1 according to the invention is also of low viscosity at a solids content of 100 wt. % (that is to say undiluted) and is not solid, and also has significantly lower viscosities in the various dilutions. Example 1 furthermore has a better resistance to chemicals (ethanol). Finally, it can be clearly seen that the example according to the invention has a significantly higher reactivity than the comparison examples.

The invention claimed is:

1. A process for preparing a low-viscosity, water-dilutable polyurethane (meth)acrylate comprising reacting components (a), (c), (d), and (e)
    (a) at least one oligomeric polyisocyanate having an average of at least three isocyanate groups;
    (c) at least one polyoxyalkylene mono-ol;
    (d) at least one hydroxyalkyl (meth)acrylate;
    (e) at least one polyoxyalkylene polyol based on a starter molecule which has at least three hydroxyl functional groups and is partially reacted by esterification with (meth)acrylic acid such that on average 0.2 to 1.5 hydroxyl functional groups still remain;
    to form said low-viscosity, water-dilutable polyurethane (meth)acrylate;
    wherein said low-viscosity, water-dilutable polyurethane (meth)acrylate has an NCO content of less than 0.5 weight %.

2. The process of claim 1, wherein a further component (b), which is at least one further isocyanate with at least two isocyanate functional groups, is reacted with components (a), (c), (d), and (e).

3. The process of claim 1, wherein a further component (f), which has at least one compound with at least one group which is reactive towards isocyanate and at least one ionic and/or potentially ionic functional group, is reacted with components (a), (c), (d), and (e).

4. The process of claim 1, wherein (a) is at least one oligomeric polyisocyanate based on 1,6-hexamethylene-diisocyanate.

5. The process of claim 1, wherein (a) is at least one oligomeric polyisocyanate with isocyanurate groups.

6. The process of claim 1, wherein the polyoxyalkylene mono-ol (c) contains at least 30 mol % of ethylene oxide units.

7. The process of claim 1, wherein component (c) is a polyoxyethylene mono-ol with an OH number of from 18 to 238 mg of KOH/g.

8. The process of claim 1, wherein component (e) contains on average 0.5 to 8.0 ethylene oxide units per OH group of the starter molecule.

9. The process of claim 1, wherein the process is carried out with 20 to 50 weight % of component (a), 0 to 20 weight % of component (b), 10 to 30 weight % of component (c), 4 to 20 weight % of component (d), 25 to 60 weight % of component (e) and 0 to 10 weight % of component (f), wherein the sum of the weight % of components (a) to (f) is 100; wherein component (b), which is at least one further isocyanate with at least two isocyanate functional groups, is reacted with components (a), (c), (d), and (e); and component (f), which has at least one compound with at least one group which is reactive towards isocyanate and at least one ionic and/or potentially ionic functional group, is reacted with components (a), (c), (d), and (e).

10. A water-dilutable polyurethane (meth)acrylate obtained by the process of claim 1.

11. A coating comprising the water-dilutable polyurethane (meth)acrylate of claim 10.

12. The coating of claim 11, wherein said coating is a lacquer or adhesive.

13. A coating composition comprising the water-dilutable polyurethane (meth)acrylate of claim 10.

14. A coating composition comprising
    A) at least one urethane (meth)acrylate of claim 10;
    B) optionally a compound which differs from A) and contains groups which react, by polymerization, with ethylenically unsaturated compounds under the action of actinic radiation;
    C) optionally an aqueous binder which is not radiation-curable;
    D) an initiators;
    E) optionally water and/or a solvent;
    F) optionally an auxiliary substance and/or additive.

15. A substrate coated with the coating composition of claim 13.

16. The substrate of claim 15, wherein said substrate is wood, a ligneous substrate, cork, or a substrate containing cellulose fibres.

* * * * *